Patented Sept. 17, 1929

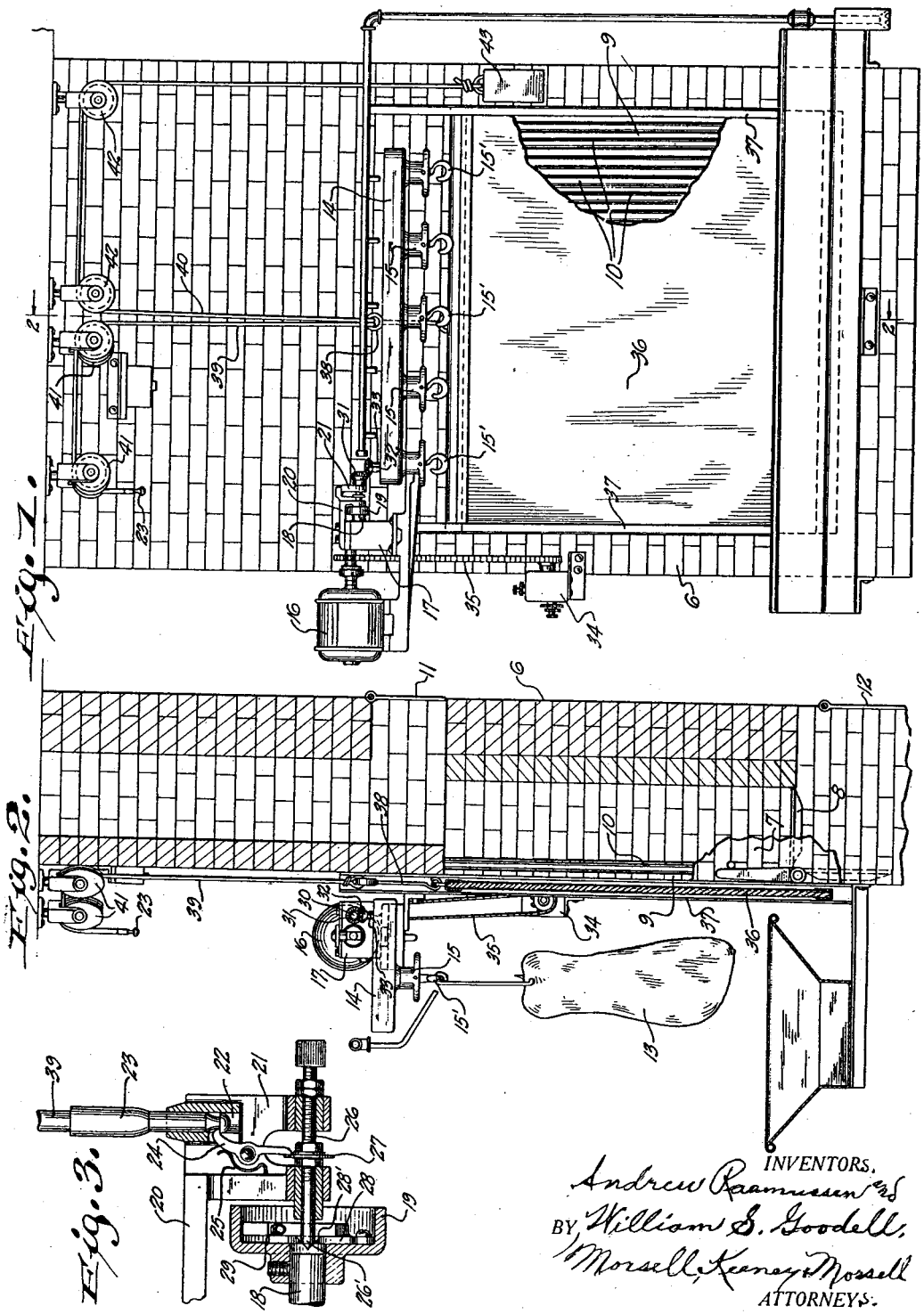

1,728,738

UNITED STATES PATENT OFFICE

ANDREW RASMUSSEN AND WILLIAM S. GOODELL, OF RACINE, WISCONSIN

BARBECUE-MACHINE GUARDING DEVICE

Application filed February 20, 1928. Serial No. 255,664.

This invention relates to improvements in barbecue machine guarding devices, and more particularly to an automatically operated curtain interposable, under certain contingencies, between the cooking medium and the meats being cooked.

In barbecue machines of a certain type meats are suspended and rotated before a wall oven. The meats are mechanically rotated and should the rotating means, for any reason, cease to function properly, certain portions of the meats would be subjected to too much heat and would be spoiled. This is also true if the rotating means be intentionally stopped and the oven is not turned off.

It is, therefore, the primary object of the present invention to provide in a barbecue machine, a fire and heat resisting means which will be automatically interposed between the oven and the meats whenever the meat rotating means ceases functioning at a predetermined speed.

A further object of the invention is to provide a barbecue machine oven curtain which is normally, during roasting operations, releasably held in an out of the way position.

A further object of the invention is to provide a device of the character described which is simple, effective, and positive in its operation.

A further object of the invention is to provide a barbecue machine guarding device which is of very simple construction, is strong and durable, is inexpensive to manufacture, and is well adapted for the purposes described.

With the above and other objects in view the invention consists of the improved barbecue machine guarding device, and its parts and combinations as set forth in the claims, and all equivalents thereof.

In the accompanying drawing in which the same reference characters indicate the same parts in all of the views:

Fig. 1 is a front view of a barbecue machine showing the improved guarding device in its effective or guarding position, part of the same being broken away to show the oven;

Fig. 2 is a vertical sectional view taken on line 2—2 of Fig. 1; and

Fig. 3 is an enlarged detail fragmentary sectional view showing the releasable means for retaining the guarding device in its inoperative position.

Referring now more particularly to the drawing, it will appear that the numeral 6 indicates a wall oven which is provided with a fire box 7, a tiltable grate 8, a side opening 9 covered by grating bars 10, and a clean-out door 12 and a fuel inlet door 11. The side opening 9, protected by the grating bars 10, forms the heating means for roasting or broiling meats or other materials 13 hung in front of said opening.

A horizontal frame 14 is mounted on the upper front wall portion of the oven and a plurality of rotating members 15 having depending hook portions 15' are rotatably mounted in said frame 14. As shown in Fig. 2, the meats or materials to be cooked are suspended from said hook portions 15'.

An electric motor 16 is mounted adjacent said frame 14 and the motor shaft operates through a gear reduction 17 to turn a shaft 18 which carries a governor member 19 at its outer end portion. Secured to the upper portion of the gear reduction housing is an arm 20 having a right angular, bifurcated depending portion 21. Said portion 21 is formed with a vertical bore 22 within which a shouldered pin 23 is adapted to be extended, and as will later be explained, said pin, while in the bore is constantly subjected to an upward force, but is normally held against withdrawal by the engagement of a bell crank lever 24 with the pin shoulder. The bell crank lever is pivotally secured to the member 21 and is yieldingly held in engaging position by a flat spring 25.

The bifurcated lower end portions of the member 21 have slidably extended therethrough an actuating rod 26 having a pointed inner end portion 26'. A disc 27 is mounted fast on the rod 26 between the bifurcated portions of the member 21 and said disc engages the lower end portion of the bell crank lever 24 to move said lever out of engagement with the pin shoulder upon an outward movement of the rod 26.

The governor member 19 is cup shaped and pivotally mounted at one end portion within the same is a curved weighted arm 28 having a beveled portion 28' which portion is adapted to slide under the pointed end portion 26' of the rod 26 to move the rod outwardly, whereby the disc is moved to trip said bell crank lever 24, releasing the pin 23. The arm 28 is connected with a spring 29 which normally holds it inwardly to hold the rod in its outer position. However, when the governor member is rotated at or above a predetermined speed centrifugal force will overcome the tension of the spring so that said arm will be pivotally moved outwardly of the rod end 26' and allow the same to assume its inner position, as in Fig. 3, wherein the pin 23 will be engaged by the bell crank lever 24. When the speed of rotation is decreased, or altogether stopped, the arm will move inwardly, forcing out the rod 26 for disengaging the pin 23, with the result shown in Fig. 2.

Driven by the motor 16 through the gear reduction 17 is a shaft 30 carrying a bevel gear 31 meshing with a bevel gear 32 which drives a shaft 33 to operate mechanism (not shown) within the frame 14 to rotate the meat carrying members 15. An automatic control and time switch 34 is driven from the shaft 30 by a sprocket chain and wheel connection 35 to provide for the cooking and basting periods.

One of the important features of the invention resides in a fire-proof curtain 36 vertically slidably mounted at its edge portions in channeled members 37 positioned at the sides of the grate bars, the curtain being adapted to cover the oven opening 9 so as to be interposed between the fire and the material being cooked. The upper edge of the curtain has attached thereto a hook member 38 from which extend a pair of cables 39 and 40. The cable 39 extends over a pair of pulleys 41 depended considerably above the oven opening and the free end portion of said cable carries said shouldered pin 23. The other cable 40 extends over a pair of upper pulleys 42 and its free end portion carries a weight 43. The weight has somewhat of a counter-balancing effect on the curtain but is a trifle lighter than the same so that when the curtain is released from its raised position gravity will cause it to drop to a guarding position.

During normal operations of the barbecue machine the motor will be operating and turning the members 15 sufficiently rapidly so that the roasts will not be scorched nor burned. Also, when the motor is so functioning the governor 19 will be operating, and the curtain, which had previously been raised, will be held in raised position by the engagement of the bell crank lever with said pin, as shown in Fig. 3. If, however, something should happen which would prevent the motor from turning the members 15 sufficiently fast, or if the motor should stop altogether, the pin 23 will be released and gravity will cause the curtain to automatically drop to the guarding position shown in Figs. 1 and 2, wherein the roasts will be protected against the heat of the oven.

From the foregoing description it will be seen that the improved barbecue machine guarding device is of simple and novel construction, and is well adapted for the purpose described.

What is claimed as the invention is:

1. In a cooking device having an oven, a movable material holding member, and means for moving said member, a heat resisting guard automatically movable, when said material holding member ceases to be moved at a predetermined speed, to a position covering said oven.

2. In a cooking device having an oven, a rotatable roast holding member, and means for rotating said roast holding member, an oven guard member held in an inoperative position when said rotating means is operating at a predetermined speed, and automatically movable to a guarding position in front of said oven when said rotating means ceases to operate at a predetermined speed.

3. In a cooking device having an oven, a rotatable roast holding member, and means for rotating said roast holding member, an oven guard member movable into and out of positions between the oven and the roast holding member, and an automatic trip device connected with and controlled by said rotating means for holding the guard member in an inoperative position under certain conditions and releasing it under other conditions.

4. In a cooking device having an oven, a rotatable roast holding member, and means for rotating said roast holding member, an oven guard member movable into and out of positions between the oven and the roast holding member, and a governor controlled trip device connected with and operated by said rotating means for holding the guard member in an inoperative position under certain conditions and releasing it under other conditions.

5. In a cooking device having an oven, a rotatable roast holding member, and means for rotating said roast holding member, a vertically movable fire resisting curtain mounted adjacent said oven, and an automatic governor controlled trip device connected with and operated by said rotating means for holding said curtain in a raised position above said oven when the rotating means is operating at a predetermined speed and for releasing and permitting the curtain to drop when said rotating means fails to operate at the predetermined speed.

6. A barbecue machine, comprising a cooking member, a movable meat holding member having meat suspended therefrom adjacent said cooking member, and a fire resisting guard member slidably mounted adjacent said cooking member, said guard member being manually movable to an inoperative position, exposing the cooking member and being automatically movable by a cessation of speed of the meat holding member to a guarding position between the cooking member and the meat.

7. A barbecue machine, comprising a cooking member, a movable meat holding member having meat suspended therefrom adjacent said cooking member, a fire resisting guard member vertically slidably mounted adjacent said cooking member, means for releasably holding said guard member in a raised inoperative position, and automatic means for operating said holding means to permit said guard member to drop to an operative position.

8. A barbecue machine, comprising a wall oven having a slide opening, a rotatable meat holding member having meat suspended therefrom in front of said oven, mechanism for turning said meat holding member, a fire resisting guard member vertically slidably mounted adjacent said oven opening, a latch member for holding said guard member in a raised position above said oven opening, and a governor controlled member connected with said turning mechanism for automatically releasing the latch to permit the guard member to drop to an oven covering position.

In testimony whereof, we affix our signatures.

ANDREW RASMUSSEN.
WILLIAM S. GOODELL.